US012591523B2

(12) United States Patent
Sundar et al.

(10) Patent No.: US 12,591,523 B2
(45) Date of Patent: Mar. 31, 2026

(54) PRIORITY-BASED CACHE EVICTION POLICY GOVERNED BY LATENCY CRITICAL CENTRAL PROCESSING UNIT (CPU) CORES

(71) Applicant: QUALCOMM Incorporated, San Diego, CA (US)

(72) Inventors: Kalangi Fredy Sundar, Hyderabad (IN); Mohd Salman, Kiratpur (IN); Hithesh Hassan Lepaksha, Hyderabad (IN); Sharath Kumar Nagilla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/408,322

(22) Filed: Jan. 9, 2024

(65) Prior Publication Data

US 2025/0225081 A1     Jul. 10, 2025

(51) Int. Cl.
*G06F 12/12* (2016.01)
*G06F 12/0811* (2016.01)
*G06F 12/123* (2016.01)

(52) U.S. Cl.
CPC ........ *G06F 12/123* (2013.01); *G06F 12/0811* (2013.01)

(58) Field of Classification Search
CPC .... G06F 12/08; G06F 12/0811; G06F 12/123; G06F 12/12; G06F 12/084; G06F 12/0871; G06F 12/126; G06F 12/0828
See application file for complete search history.

(56) References Cited

U.S. PATENT DOCUMENTS

| | | | | |
|---|---|---|---|---|
| 8,065,487 B2 * | 11/2011 | Kornegay | ............. | G06F 12/121 |
| | | | | 711/E12.052 |
| 9,355,043 B2 * | 5/2016 | Sadok | ................... | G06F 12/126 |
| 9,378,153 B2 * | 6/2016 | Jafri | ...................... | G06F 12/127 |
| 10,284,470 B2 * | 5/2019 | Wang | ................... | H04L 45/742 |
| 10,691,614 B1 * | 6/2020 | Subramani | ......... | G06F 11/3419 |

(Continued)

FOREIGN PATENT DOCUMENTS

| | | | | |
|---|---|---|---|---|
| WO | WO-2017027111 A1 * | 2/2017 | ......... | G06F 12/0862 |
| WO | WO-2022066339 A1 * | 3/2022 | ............... | G06F 1/28 |

OTHER PUBLICATIONS

M. Ohmacht, D. Hoenicke, R. Haring and A. Gara, "The eDRAM based L3-cache of the BlueGene/L supercomputer processor node," 16th Symposium on Computer Architecture and High Performance Computing, Foz do Iguacu, Brazil, 2004, pp. 18-22.*

(Continued)

*Primary Examiner* — Pierre Michel Bataille
(74) *Attorney, Agent, or Firm* — Seyfarth Shaw LLP

(57)     ABSTRACT

A processor-implemented method for a priority-based cache eviction policy includes receiving a read request from a first processing core for first data in a level three (L3) cache memory shared with a second processing core. The first processing core has a first operating frequency that is less than a second operating frequency of the second processing core. Responsive to the L3 cache being full, the policy further includes determining a second data or a third data stored in the L3 cache to evict based on a priority. The priority is based on an association of the second data or the third data to the first processing core or the second processing core.

12 Claims, 6 Drawing Sheets

(56)                References Cited

U.S. PATENT DOCUMENTS

| | | | | |
|---|---|---|---|---|
| 11,681,617 | B2* | 6/2023 | Klimov | G06F 21/79 |
| | | | | 713/193 |
| 2003/0093636 | A1* | 5/2003 | Henry | G06F 12/0802 |
| | | | | 711/158 |
| 2008/0091880 | A1* | 4/2008 | Vishin | G06F 12/0842 |
| | | | | 711/E12.039 |
| 2008/0235456 | A1* | 9/2008 | Komnegay | G06F 12/121 |
| | | | | 711/130 |
| 2015/0067266 | A1* | 3/2015 | Jafri | G06F 12/0804 |
| | | | | 711/136 |
| 2017/0024329 | A1* | 1/2017 | Ishii | G06F 12/126 |
| 2017/0039144 | A1* | 2/2017 | Wang | G06F 12/126 |
| 2017/0115892 | A1* | 4/2017 | Gokita | G06F 3/0611 |
| 2017/0255563 | A1* | 9/2017 | Kamruzzaman | G06F 12/126 |
| 2018/0113815 | A1* | 4/2018 | Eckert | G06F 12/126 |
| 2018/0165219 | A1* | 6/2018 | Yang | G06F 12/121 |
| 2020/0117602 | A1* | 4/2020 | Chirca | G06F 3/0659 |
| 2020/0210340 | A1* | 7/2020 | Zhang | G06F 12/0842 |
| 2020/0285592 | A1* | 9/2020 | Ambroladze | G06F 12/128 |
| 2020/0371960 | A1* | 11/2020 | Bhoria | G11C 29/72 |
| 2021/0165739 | A1* | 6/2021 | Srinivasan | G06F 12/0817 |
| 2021/0200656 | A1* | 7/2021 | Weissmann | G06F 15/80 |
| 2022/0171712 | A1* | 6/2022 | Reed | G06F 12/0811 |
| 2022/0206862 | A1* | 6/2022 | Gupta | G06F 9/3851 |
| 2023/0014565 | A1* | 1/2023 | Ray | G06F 7/58 |

OTHER PUBLICATIONS

D. Hackenberg, D. Molka and W. E. Nagel, "Comparing cache architectures and coherency protocols on x86-64 multicore SMP systems," 2009 42nd Annual IEEE/ACM International Symposium on Microarchitecture (MICRO), New York, NY, USA, 2009, pp. 413-422.*
E. Arima, "Classification-Based Unified Cache Replacement via Partitioned Victim Address History," 2020 23rd Euromicro Conference on Digital System Design (DSD), Kranj, Slovenia, 2020, pp. 101-108.*
A. Sembrant, E. Hagersten and D. Black-Schaffer, "Data placement across the cache hierarchy: Minimizing data movement with reuse-aware placement," 2016 IEEE 34th International Conference on Computer Design (ICCD), Scottsdale, AZ, USA, 2016, pp. 117-124.*

* cited by examiner

100

| | |
|---|---|
| 102 — CPU | MULTIMEDIA — 112 |
| 104 — GPU | |
| 106 — DSP | SENSORS — 114 |
| 108 — NPU | ISPs — 116 |
| 110 — CONNECTIVITY | MEMORY — 118 |
| | NAVIGATION — 120 |

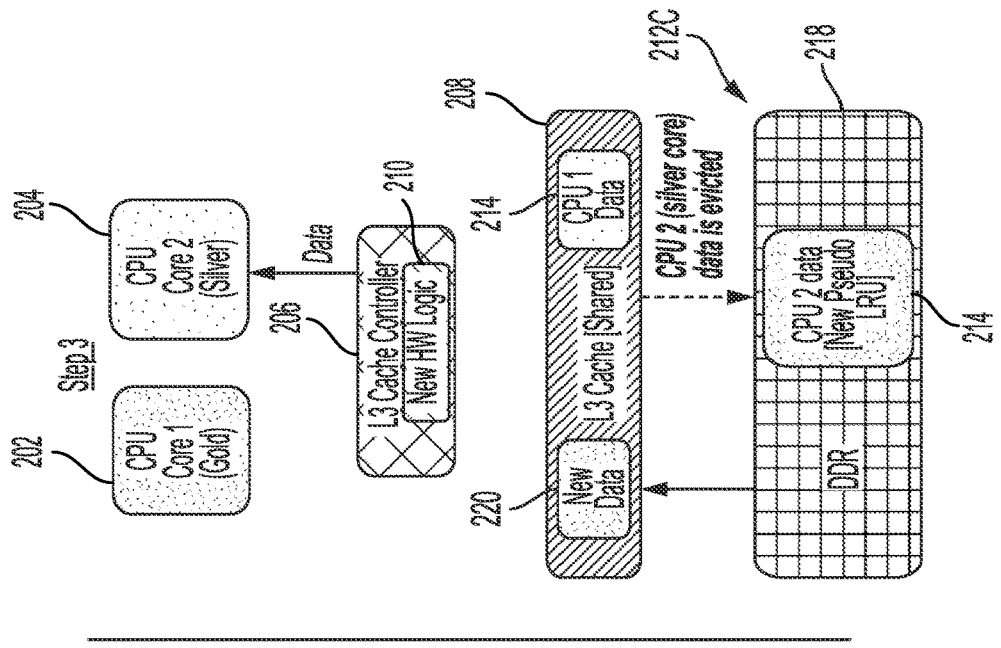
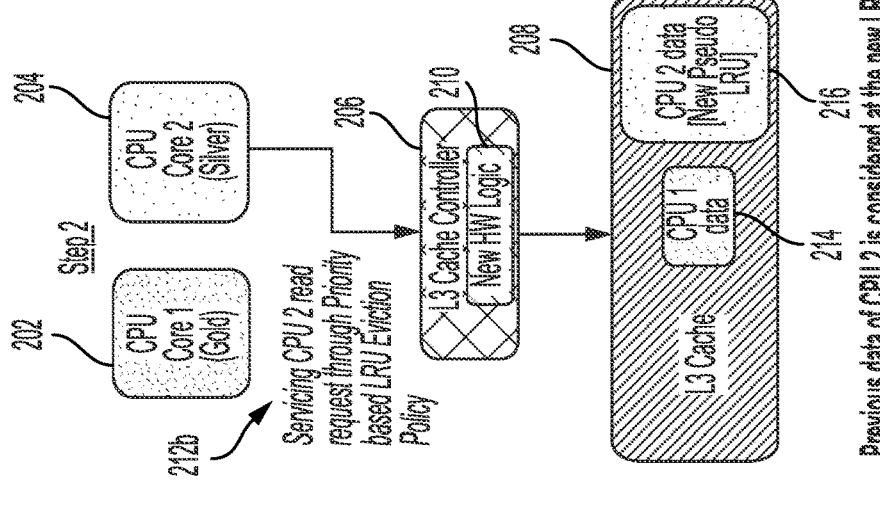
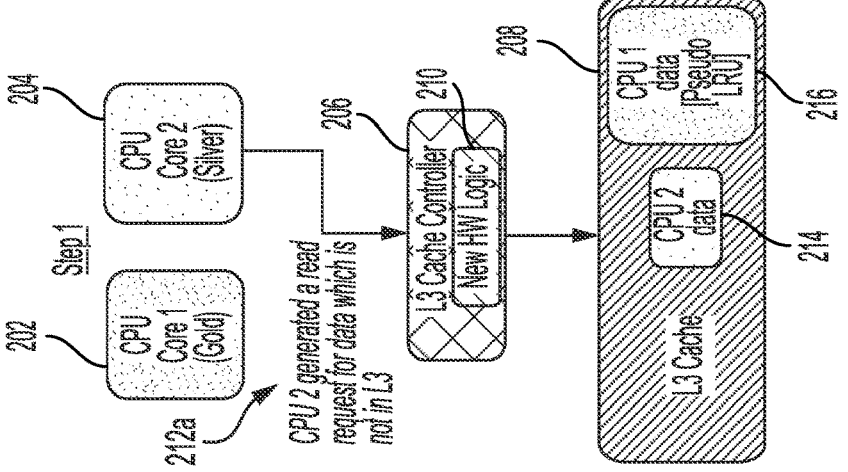
*FIG. 2*

Silver core modifies the shared cache-line in L3.
As the tagram is aware of the modified data is a of a shared cache-line with a gold core, corresponding L2 cache-line gets updated instead of getting invalidated Both CPU Core 1 and Core 2 generate read requests to the same address cached in L3 and new cacheline is allocated in respective L2.

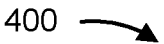

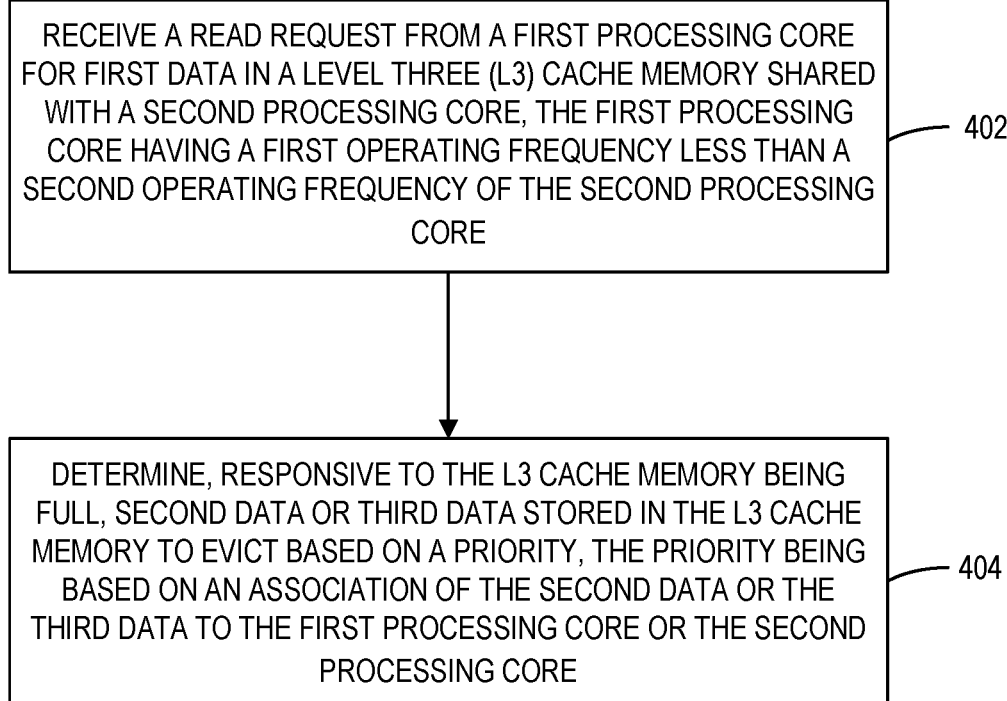

400

RECEIVE A READ REQUEST FROM A FIRST PROCESSING CORE FOR FIRST DATA IN A LEVEL THREE (L3) CACHE MEMORY SHARED WITH A SECOND PROCESSING CORE, THE FIRST PROCESSING CORE HAVING A FIRST OPERATING FREQUENCY LESS THAN A SECOND OPERATING FREQUENCY OF THE SECOND PROCESSING CORE — 402

DETERMINE, RESPONSIVE TO THE L3 CACHE MEMORY BEING FULL, SECOND DATA OR THIRD DATA STORED IN THE L3 CACHE MEMORY TO EVICT BASED ON A PRIORITY, THE PRIORITY BEING BASED ON AN ASSOCIATION OF THE SECOND DATA OR THE THIRD DATA TO THE FIRST PROCESSING CORE OR THE SECOND PROCESSING CORE — 404

*FIG. 4*

PRIORITY-BASED CACHE EVICTION POLICY GOVERNED BY LATENCY CRITICAL CENTRAL PROCESSING UNIT (CPU) CORES

BACKGROUND

Field

Aspects of the present disclosure relate to computing devices, and more specifically to priority-based cache eviction policy governed by latency critical central processing unit (CPU) cores.

Background

Mobile or portable computing devices include mobile phones, laptop, palmtop, and tablet computers, portable digital assistants (PDAs), portable game consoles, and other portable electronic devices. Mobile computing devices are comprised of many electrical components that consume power and generate heat. The components (or compute devices) may include system-on-a-chip (SoC) devices, graphics processing unit (GPU) devices, neural processing unit (NPU) devices, digital signal processors (DSPs), and modems, among others.

Cache memories may be employed to boost the performance of computing systems by reducing access time to certain data relative to storing the data in slower storage such as main memory. However, cache memory may be lower in capacity than main memory. When the capacity of the cache memory is reached, data may have to be evicted (e.g., removed) to enable other data to be stored. Cache eviction policies may be created to determine how to manage data in the cache, for instance, by retaining recent or often used data in the cache memory locations and other data in main memory. Conventional cache eviction policies may employ a least recently used approach to determine the data to be evicted. However, the conventional approaches may evict data without regard to differences in priority among the data or processing cores.

SUMMARY

In some aspects of the present disclosure, a processor-implemented method includes receiving a read request from a first processing core for first data in a level three (L3) cache memory shared with a second processing core. The first processing core has a first operating frequency that is less than a second operating frequency of the second processing core. The processor-implemented method further includes determining, responsive to the L3 cache memory being full, second data or third data stored in the L3 cache memory to evict based on a priority. The priority is based on an association of the second data or the third data to the first processing core or the second processing core.

Various aspects of the present disclosure are directed to an apparatus including means for receiving a read request from a first processing core for first data in a level three (L3) cache memory shared with a second processing core. The first processing core has a first operating frequency that is less than a second operating frequency of the second processing core. The apparatus also includes means for determining, responsive to the L3 cache memory being full, second data or third data stored in the L3 cache memory to evict based on a priority. The priority is based on an association of the second data or the third data to the first processing core or the second processing core.

Some aspects of the present disclosure are directed to an apparatus having at least one memory and hardware logic coupled to the at least one memory. The hardware logic is configured to receive a read request from a first processing core for first data in a level three (L3) cache memory shared with a second processing core. The first processing core has a first operating frequency less that is than a second operating frequency of the second processing core. The hardware logic is also configured to determine, responsive to the L3 cache memory being full, second data or third data stored in the L3 cache memory to evict based on a priority. The priority is based on an association of the second data or the third data to the first processing core or the second processing core.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 2 is a block diagram of a computing system illustrating an example of priority-based cache eviction, in accordance with various aspects of the present disclosure.

FIG. 4 is a flow diagram illustrating an example process for a priority-based eviction policy performed, for example, by a computing device, in accordance with various aspects of the present disclosure.

DETAILED DESCRIPTION

Figure 1:
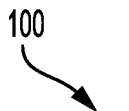
FIG. 1 illustrates an example implementation of a host system-on-a-chip (SoC), in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term "and/or" is intended to represent an "inclusive OR," and the use of the term "or" is intended to represent an "exclusive OR." As described, the term "exemplary" used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

As described, cache memories may be employed to boost the performance of computing systems by reducing access time to certain data relative to storing the data in slower storage such as main memory (e.g., random access memory (RAM)). Cache memories may include three different types: level one (L1) cache, level two (L2) cache, and level three (L3) cache. The L1 cache may be considered the fastest memory present in a computing system (e.g., may be 100 times faster than main memory). The L1 cache may store data that the processor may most likely use while completing a specific task. The L1 cache may be split into an instruction cache and a data cache, in which the instruction cache includes instructions that the processor has to perform and the data cache includes data on which the operations may be performed. The L2 cache may be larger in size than the L1 cache (e.g., the L1 cache may have a size such as 1 or 2 megabytes (MB), while the L2 cache may have a size such as 2-32 MB). The L2 cache may be slower than the L1 cache but faster than RAM (e.g., the L2 cache may be 25 times faster than RAM). The L3 cache may be the largest cache (e.g., 128 MB) but may be slower than the L1 cache and L2 cache. The L3 cache may be shared between different processing cores within the computing system. For instance, the L3 cache may be shared by higher performance processing cores and lower performance processing cores.

Cache memories may be considered local memories. Cache memories may be incorporated with processing cores or may be located in close proximity to the processing cores. For instance, the L1 cache and L2 cache may be included in the processing core. The L3 cache may be included on a same chip such as a system-on-a-chip (SoC) or another integrated circuit.

When the capacity of a cache memory is reached, data may have to be evicted (e.g., removed) to enable other data to be stored. Cache eviction policies may be created to determine how to manage data in the cache, for instance, by retaining recent or often used data in the cache memory locations and other data in a main (global) memory. Conventional cache eviction policies may employ a least recently used approach to determine the data to be evicted.

However, some computing systems may offer higher performance processing cores for use with time sensitive applications and tasks. For example, gold cores may be used for high performance and time sensitive operations. Additional tiers of processing cores may also be provided. For instance, gold plus cores may operate at a higher operating frequency than the gold cores and silver cores may operate at lower frequency than the gold cores. However, the conventional approaches may evict data without regard to differences in priority among the data or the processing cores. When the L3 cache is shared by such processing cores, data of the higher performance core (e.g., gold cores) may be evicted in favor of data for the lower performance core (e.g., silver cores) based on recency. As such, the higher performance core may experience a cache miss. A cache miss is an event in which a processing core or application requests to retrieve specific data from a cache, but the specific data is not currently in cache memory. Thus, the specific data may have to be fetched again from main memory from the double data rate (DDR) bus resulting in increased latency for the higher performance cores.

Accordingly, to address these and other problems, aspects of the present disclosure are directed to a priority-based cache eviction policy. In various aspects, the priority-based cache eviction policy may be governed by a processing core such as a central processing unit (CPU) core, for example.

Particular aspects of the subject matter described in this disclosure can be implemented to realize one or more of the following potential advantages. In some examples, the described techniques may reduce cache misses and latency for higher performance processing cores and improve single thread performance.

Moreover, aspects of the present disclosure may beneficially have application in latency sensitive systems such as an advanced driver assistance system (ADAS). For example, such latency sensitive systems may be operated on higher performance cores (e.g., gold cores) and less sensitive systems such as infotainment may be operated on lower performance cores (e.g., silver cores). In such scenarios, the priority-based cache eviction may reduce cache misses with respect to the latency sensitive systems and may increase vehicle safety.

The priority-based cache eviction policy may also be applied in devices including a heterogenous multicore system-on-a-chip (SoC). For instance, the heterogeneous SoC may include a higher performance core operating at peak performance (e.g., higher operating frequency) in latency sensitive use cases such as high frequency trading.

In another example, the priority-based cache eviction policy may be applied in systems in which CPU centric processing is critical and CPUs are always active, such as in server chipsets.

FIG. 1 illustrates an example implementation of a host system-on-a-chip (SoC) 100, which includes a cache eviction manager module for managing a priority-based cache eviction policy, in accordance with aspects of the present disclosure. The host SoC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, universal serial bus (USB) connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU) 108. The host SoC 100 may also include a sensor processor 114, image signal processors (ISPs) 116, a navigation module 120, which may include a global positioning system (GPS), and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

As described aspects of the present disclosure are directed to a priority-based cache eviction policy. In various aspects, the priority-based cache eviction policy may be governed according to a type (e.g., power/performance core) of processing core such as a central processing unit (CPU) core, for example. In some aspects, hardware logic in tag RAM of the L3 cache controller may tag the transaction with an identifier (ID) associated with the processing core. Tag RAM refers to a specialized bank of static RAM that holds addresses. When a stored address matches an input address, a signal may be output to perform a certain function. Additionally, the tag RAM may also include a mapping of the ID to a type of processing core (e.g., gold plus/gold/silver).

According to aspects of the present disclosure, a computing device includes a means for managing a priority-based cache eviction policy. In some aspects the managing means may include receiving means receiving a read request from a first processing core for first data in a level three (L3) cache memory shared with a second processing core and a means for determining, responsive to the L3 cache memory being full, second data or third data stored in the L3 cache memory to evict based on a priority. In one configuration, the receiving means and/or the determining means may be the CPU 102 memory 118 as shown in FIG. 1, the L3 cache controller 206, and/or the eviction manager 210 as shown in FIG. 2, for example. In other aspects, the aforementioned means may be any structure or any material configured to perform the functions recited by the aforementioned means.

In various aspects, the priority-based cache eviction policy may include an inline caching policy or a victim caching policy. In the inline caching policy, the L3 cache may be at full capacity and may have no invalid cache lines. A cache line may be considered a smallest portion of data that may be mapped into a cache memory. Cache invalidation may be considered a process in which entries in a cache may be replaced or removed. When a cache memory location has been changed, the cached values of the memory location may be invalidated.

In this scenario, the least recently used (LRU) data is from a higher performance core, but the subsequently LRU data is from a silver core. If any core (e.g., gold or silver) is making a new read request, as the tag RAM is aware (e.g., through the processing core ID) that the LRU data is from a higher performance processing core (e.g., gold core), the priority-based cache eviction policy may map the subsequent lower performance processing core (e.g., silver core) data as the new LRU and evict the data. Thus, the higher performance processing core (e.g., gold core) data may be preserved in the cache memory (e.g., L3 cache) for a longer period of time to reduce the cache misses.

In the victim caching policy, the L3 cache may be at full capacity and may have no invalid cache lines. The higher performance processing core (e.g., gold core) and the lower performance processing core (e.g., silver core) may read the same cache line from the L3 cache and may be allocated in their respective L2 cache and L1 cache. If the lower performance processing core (e.g., silver core) or any non-higher performance processing core modifies the data for the shared cache line in the L2 cache, instead of invalidating the corresponding cache line in the higher performance processing core (e.g., gold core) L2 cache, the cache line may be updated to reduce the L2 cache misses for the higher performance processing core (e.g., gold core).

In cases in which the data in the L3 cache is of the higher performance processing core (e.g., gold core), L3 eviction may be conducted using the LRU. In some aspects, additional priority-based management may be provided based on the latency sensitivity of the application using the identifier of the processing core, for instance.

FIG. 2 is a block diagram of a computing system 200 illustrating an example sequence of a priority-based cache eviction, in accordance with various aspects of the present disclosure. Referring to FIG. 2, the computing system 200 may include a processing core 1 202 (e.g., gold core or gold plus core), a processing core 2 204 (e.g., silver core), an L3 cache controller 206, and an L3 cache 208. The processing core 1 202 may be a higher performance processing core (e.g., higher operating frequency) and the processor core 2 204 may be a lower performance processing core. The L3 cache 208 may include data 1 216 of the processing core 1 202 and data 2 214 of processing core 2 204. The data 1 216 of the processing core 1 202 may be the least recently used data in the L3 cache 208.

The L3 cache controller 206 may include an eviction manager 210 having hardware logic configured to implement the priority-based cache eviction policy. At time 212a, the processing core 2 204 may generate a read request for data, which is not stored (e.g., the address is not included) in the L3 cache 208. The processing core 2 204 may send the read request to the L3 controller 206, which may in turn determine that a cache miss event has occurred with respect to the requested data.

At time 212b, the read request may be provided to the eviction manager 210. The eviction manager 210 may determine that the L3 cache 208 is full (e.g., there is insufficient capacity to store the requested data) and/or that L3 cache 208 has no invalid cache lines. The eviction manager 210 may determine a priority among the data in the cache. For instance, the priority may be determined based on the identifier of the processing core for which the data is used. In the example of FIG. 2, because the LRU is associated with the higher performance core, processing core 1 202, the eviction manager may determine that the data 1 216 of the processing core 1 202 has a higher priority than data 2 214 of the processing core 2 204. As such, the eviction manager may reassign the data 2 214 associated with the lower performance processing core 2 204 to be the new LRU. Thus, at time 212c, the data 2 214 may be evicted in favor of requested data 220. That is, the data 2 214 may be stored in main memory via double data rate (DDR) memory 218. The requested data 220 may be fetched from the DDR memory 218 and stored in the L3 cache 208.

Figure 3:
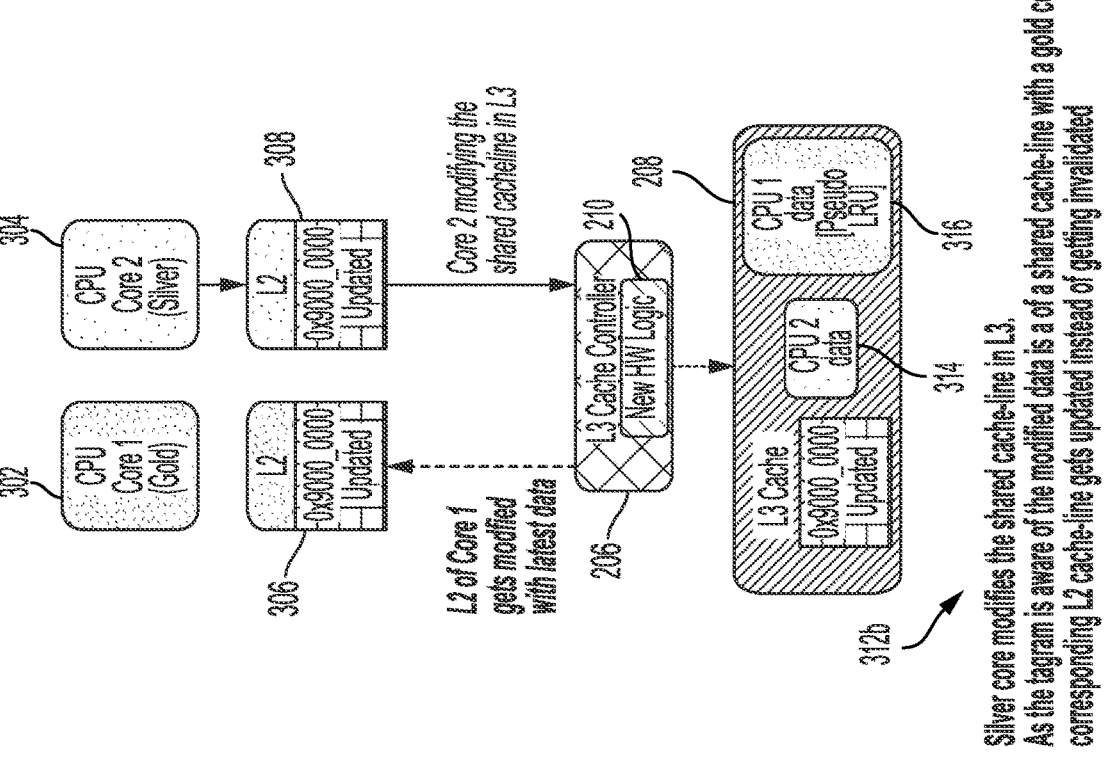
FIG. 3 is a block diagram of a computing system illustrating another example of priority-based cache eviction, in accordance with various aspects of the present disclosure.

FIG. 3 is a block diagram of a computing system 300 illustrating another example of priority-based cache eviction, in accordance with various aspects of the present disclosure. Referring to FIG. 3, the computing system 300 may include a processing core 1 302 (e.g., gold core or gold plus core), a processing core 2 304 (e.g., silver core), the L3 cache controller 206, and the L3 cache 208. The processing core 1 302 and processing core 2 304 are similar to the processing core 1 202 and processing core 2 204 of FIG. 2, respectively, however the processing core 1 302 and processing core 2 304 include an L2 cache (306, 308).

The eviction manager 210 may implement a victim caching policy. In this example, the L3 cache 208 may include data 1 316 of the processing core 1 302 and data 2 314 of the processing core 2 304.

The eviction manager 210 may determine that the L3 cache 208 is full and/or has no invalid cache lines. At 312*a*, both of the processing core 1 302 and the processing core 2 304 may generate read requests to the same address cached in the L3 cache 208. In response, a new cache line may be allocated in the respective L2 caches 306, 308. That is, the processing core 1 302 and processing core 2 (304 may then read the same cache line from the L3 cache 208, which may be allocated in their respective L2 cache (306, 308).

If the processing core 2 304 (or any lower performance (non-gold) core) modifies the data for the shared cache line in the L2 cache (e.g., 306, 308), rather than invalidating the corresponding cache line in the processing core 2 304 for the L2 cache 306, the eviction manager 210 may update the cache line with the latest data (at time 312*b*) to reduce L2 cache misses for the processing core 1 302.

FIG. 4 is a flow diagram illustrating an example process 400 for a priority-based eviction policy performed, for example, by a computing device, in accordance with various aspects of the present disclosure. The example process 400 may be executed by a processor such as a CPU 102, the L3 cache controller 206, and/or the eviction manager 210, for instance.

As shown in FIG. 4, at block 402, the processor receives a read request from a first processing core for first data in a level three (L3) cache memory shared with a second processing core, the first processing core having a first operating frequency less than a second operating frequency of the second processing core. As described, for example, with reference to FIG. 2, at time 212*a*, the processing core 2 204 may generate a read request for data, which is not stored (e.g., the address is not included) in the L3 cache 208. The processing core 2 204 may send the read request to the L3 controller 206, which may in turn determine that a cache miss event has occurred with respect to the requested data. At time 212*b*, the read request may be provided to the eviction manager 210.

At block 404, the processor determines, responsive to the L3 cache memory being full, second data or third data stored in the L3 cache memory to evict based on a priority, the priority being based on an association of the second data or the third data to the first processing core or the second processing core. For instance, as described with reference to FIG. 2, the eviction manager 210 may determine that the L3 cache 208 is full (e.g., there is insufficient capacity to store the requested data) and/or that L3 cache 208 has no invalid cache lines. The eviction manager 210 may determine a priority among the data in the cache. For instance, the priority may be determined based on the identifier of the processing core for which the data is used.

Figure 5:
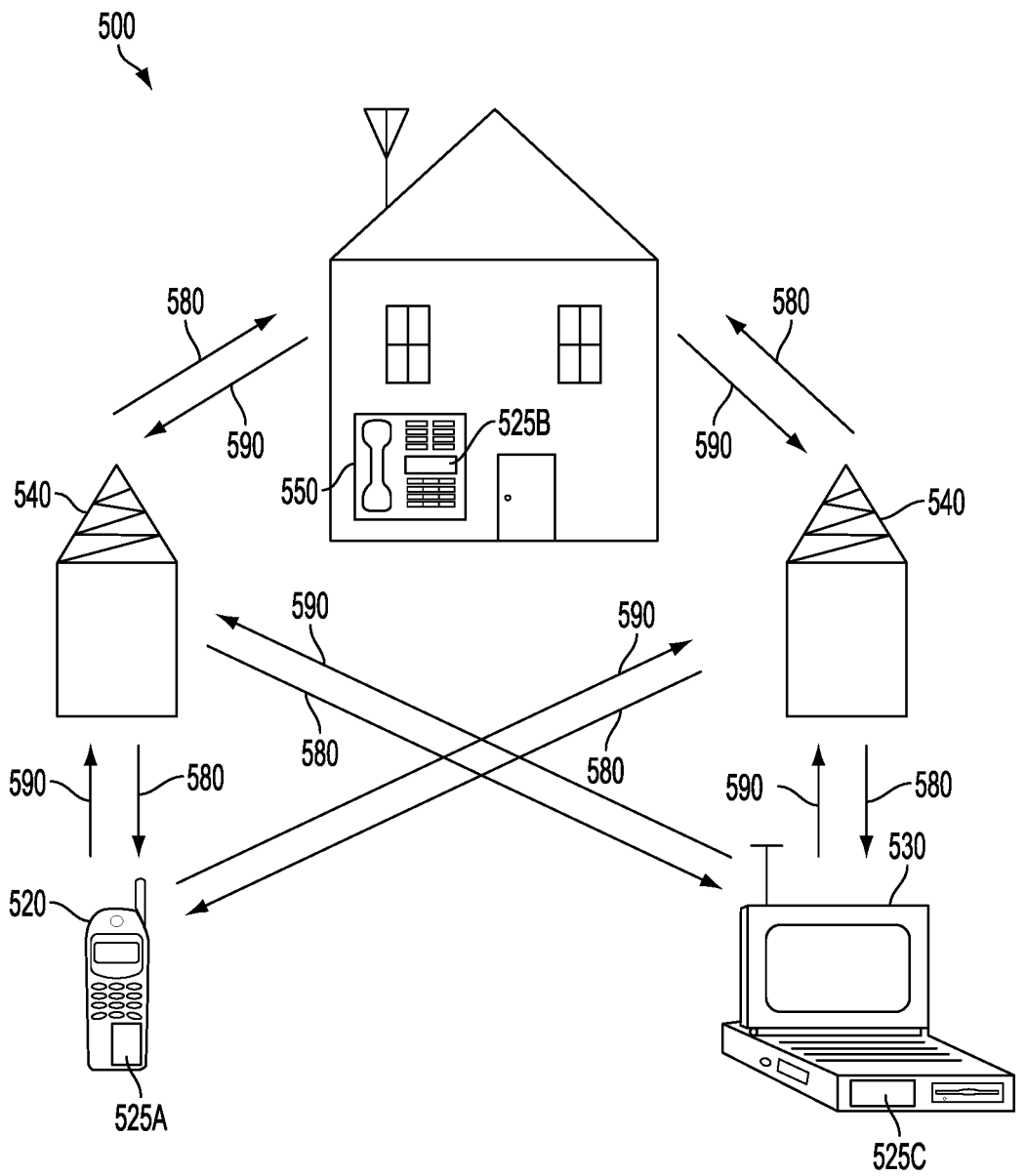
FIG. 5 is a block diagram showing an exemplary wireless communications system in which a configuration of the present disclosure may be advantageously employed.

FIG. 5 is a block diagram showing an exemplary wireless communications system 500, in which an aspect of the present disclosure may be advantageously employed. For purposes of illustration, FIG. 5 shows three remote units 520, 530, and 550, and two base stations 540. It will be recognized that wireless communications systems may have many more remote units and base stations. Remote units

520, 530, and 550 include integrated circuit (IC) devices 525A, 525B, and 525C that includes the disclosed eviction manager 210. It will be recognized that other devices may also include the disclosed eviction manager 210, such as the base stations, switching devices, and network equipment. FIG. 5 shows forward link signals 580 from the base stations 540 to the remote units 520, 530, and 550, and reverse link signals 590 from the remote units 520, 530, and 550 to the base stations 540.

In FIG. 5, remote unit 520 is shown as a mobile telephone, remote unit 530 is shown as a portable computer, and remote unit 550 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 5 illustrates remote units according to the aspects of the present disclosure, the disclosure is not limited to these exemplary illustrated units. Aspects of the present disclosure may be suitably employed in many devices, which includes the disclosed eviction manager 210.

Figure 6:
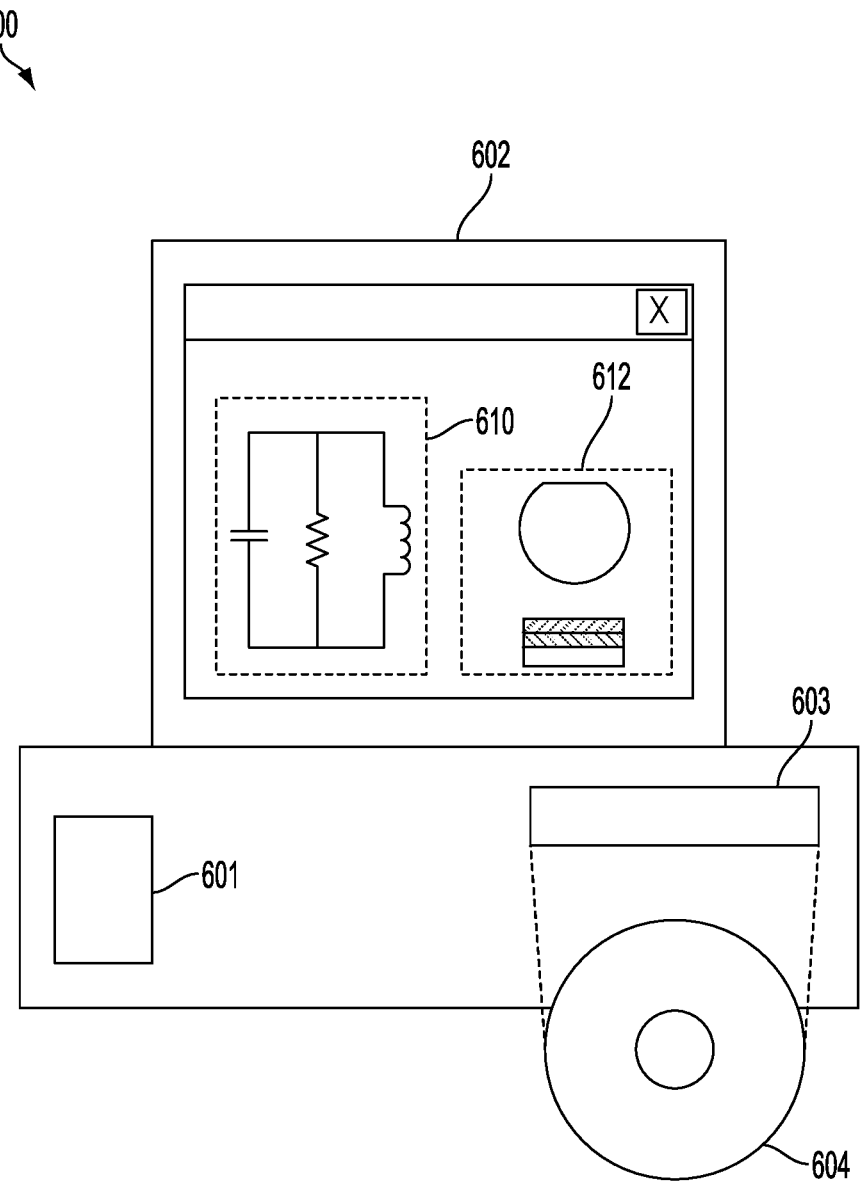
FIG. 6 is a block diagram illustrating a design workstation used for circuit, layout, and logic design of components, in accordance with various aspects of the present disclosure.

FIG. 6 is a block diagram illustrating a design workstation 600 used for circuit, layout, and logic design of a semiconductor component, such as the eviction manager 210 disclosed above. The design workstation 600 includes a hard disk 601 containing operating system software, support files, and design software such as Cadence or OrCAD. The design workstation 600 also includes a display 602 to facilitate design of a circuit 610 or a semiconductor component 612, such as the eviction manager 210. A storage medium 604 is provided for tangibly storing the design of the circuit 610 or the semiconductor component 612 (e.g., the PLD). The design of the circuit 610 or the semiconductor component 612 may be stored on the storage medium 604 in a file format such as GDSII or GERBER. The storage medium 604 may be a CD-ROM, DVD, hard disk, flash memory, or other appropriate device. Furthermore, the design workstation 600 includes a drive apparatus 603 for accepting input from or writing output to the storage medium 604.

Data recorded on the storage medium 604 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 604 facilitates the design of the circuit 610 or the semiconductor component 612 by decreasing the number of processes for designing semiconductor wafers.

Implementation examples are included in the following numbered clauses.

1. An apparatus, comprising:
   at least one memory; and
   hardware logic coupled to the at least one memory, the
      hardware logic configured to:
      receive a read request from a first processing core for
         first data in a level three (L3) cache memory
         shared with a second processing core, the first
         processing core having a first operating frequency
         less than a second operating frequency of the
         second processing core; and
      determine, responsive to the L3 cache memory being
         full, second data or third data stored in the L3
         cache memory to evict based on a priority, the priority being based on an association of the second data or the third data to the first processing core or the second processing core.

2. The apparatus of clause 1, in which the second data is associated with the second processing core and the third data is associated with the first processing core, the second data having a recency that is later than the third data and further comprising evicting the third data from the L3 cache memory.

3. The apparatus of clause 1 or 2, in which the hardware logic is further configured to adapt the recency of the second data and the third data by switching an assignment of least recently used from the third data to the second data.

4. The apparatus of any of clauses 1-3, in which the hardware logic is further configured to:

to fetch the first data from a main memory; and to allocate a cache line in the L3 cache memory for the first data.

5. The apparatus of any of clauses 1-4, in which the first processing core and the second processing core each have a level two (L2) cache memory, the first processing core and the second processing core both generating second read requests to a same address in the L3 cache memory, the first processing core modifies a cache line for the address, and further comprising updating the L2 cache memory for the second processing core according to the modification.

6. The apparatus of any of clauses 1-5, in which the second data is associated with the second processing core and the third data is associated with the first processing core, the third data having a recency that is later than the second data and the method further comprises evicting the third data from the L3 cache memory, based on the recency.

7. A processor-implemented method performed by at least one processor, the processor implemented method comprising:

receiving a read request from a first processing core for first data in a level three (L3) cache memory shared with a second processing core, the first processing core having a first operating frequency less than a second operating frequency of the second processing core; and determining, responsive to the L3 cache memory being full, second data or third data stored in the L3 cache memory to evict based on a priority, the priority being based on an association of the second data or the third data to the first processing core or the second processing core.

8. The processor-implemented method of clause 7, in which the second data is associated with the second processing core and the third data is associated with the first processing core, the second data having a recency that is later than the third data and further comprising evicting the third data from the L3 cache memory.

9. The processor-implemented method of clause 7 or 8, further comprising adapting the recency of the second data and the third data by switching an assignment of least recently used from the third data to the second data.

10. The processor-implemented method of any of clauses 7-9, further comprising:

fetching the first data from a main memory; and allocating a cache line in the L3 cache memory for the first data.

11. The processor-implemented method of any of clauses 7-10, in which the first processing core and the second processing core each have a level two (L2) cache memory, the first processing core and the second processing core both generating second read requests to a same address in the L3 cache memory, the first processing core modifies a cache line for the address, and further comprising updating the L2 cache memory for the second processing core according to the modification.

12. The processor-implemented method of any of clauses 7-11, in which the second data is associated with the second processing core and the third data is associated with the first processing core, the third data having a recency that is later than the second data and the method further comprises evicting the third data from the L3 cache memory, based on the recency.

13. An apparatus comprising:

means for receiving a read request from a first processing core for first data in a level three (L3) cache memory shared with a second processing core, the first processing core having a first operating frequency less than a second operating frequency of the second processing core; and means for determining, responsive to the L3 cache memory being full, second data or third data stored in the L3 cache memory to evict based on a priority, the priority being based on an association of the second data or the third data to the first processing core or the second processing core.

14. The apparatus of clause 13, in which the second data is associated with the second processing core and the third data is associated with the first processing core, the second data having a recency that is later than the third data and further comprising evicting the third data from the L3 cache memory.

15. The apparatus of clause 13 or 14, further comprising means for adapting the recency of the second data and the third data by switching an assignment of least recently used from the third data to the second data.

16. The apparatus of any of clauses 13-15, further comprising:

means for fetching the first data from a main memory; and means for allocating a cache line in the L3 cache memory for the first data.

17. The apparatus of any of clauses 13-16, in which the first processing core and the second processing core each have a level two (L2) cache memory, the first processing core and the second processing core both generating second read requests to a same address in the L3 cache memory, the first processing core modifies a cache line for the address, and further comprising updating the L2 cache memory for the second processing core according to the modification.

18. The apparatus of any of clauses 13-17, in which the second data is associated with the second processing core and the third data is associated with the first processing core, the third data having a recency that is later than the second data and the method further comprises evicting the third data from the L3 cache memory, based on the recency.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present disclosure is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the present disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM, flash memory, ROM, erasable programmable read-only memory (EPROM), EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to the disclosure will be readily apparent to those skilled in the art, and the generic principles defined may be applied to other variations without departing from the spirit or scope of the disclosure. Thus, the present disclosure is not intended to be limited to the examples and designs described, but is to be accorded the widest scope consistent with the principles and novel features disclosed.

What is claimed is:

1. An apparatus, comprising:
   at least one memory; and
   hardware logic coupled to the at least one memory, the hardware logic configured to:
      receive a read request from a first processing core for first data in a level three (L3) cache memory shared with a second processing core, the first processing core having a first operating frequency less than a second operating frequency of the second processing core; and
      determine, responsive to the L3 cache memory being full, second data or third data stored in the L3 cache memory to evict based on a priority, the priority being based on an operating frequency of a processing core for which the second data or the third data is requested, wherein the second data is associated with the second processing core and the third data is associated with the first processing core, the second data having a recency that is later than the third data and further comprising evicting the third data from the L3 cache memory.

2. The apparatus of claim 1, in which the hardware logic is further configured to adapt the recency of the second data and the third data by switching an assignment of least recently used from the third data to the second data.

3. The apparatus of claim 2, in which the hardware logic is further configured to:

to fetch the first data from a main memory; and to allocate a cache line in the L3 cache memory for the first data.

4. The apparatus of claim 1, in which the first processing core and the second processing core each have a level two (L2) cache memory, the first processing core and the second processing core both generating second read requests to a same address in the L3 cache memory, the first processing core modifies a cache line for the address, and further comprising updating the L2 cache memory for the second processing core according to the modification.

5. An apparatus comprising:

means for receiving a read request from a first processing core for first data in a level three (L3) cache memory shared with a second processing core, the first processing core having a first operating frequency less than a second operating frequency of the second processing core; and means for determining, responsive to the L3 cache memory being full, second data or third data stored in the L3 cache memory to evict based on a priority, the priority being based an operating frequency of a processing core for which the second data or the third data is requested, wherein the second data is associated with the second processing core and the third data is associated with the first processing core, the second data having a recency that is later than the third data and further comprising means for evicting the third data from the L3 cache memory.

6. The apparatus of claim 5, further comprising means for adapting the recency of the second data and the third data by switching an assignment of least recently used from the third data to the second data.

7. The apparatus of claim 6, further comprising:

means for fetching the first data from a main memory; and means for allocating a cache line in the L3 cache memory for the first data.

8. The apparatus of claim 5, in which the first processing core and the second processing core each have a level two (L2) cache memory, the first processing core and the second processing core both generating second read requests to a same address in the L3 cache memory, the first processing core modifies a cache line for the address, and further comprising updating the L2 cache memory for the second processing core according to the modification.

9. A processor-implemented method performed by at least one processor, the processor implemented method comprising:

receiving a read request from a first processing core for first data in a level three (L3) cache memory shared with a second processing core, the first processing core having a first operating frequency less than a second operating frequency of the second processing core; and determining, responsive to the L3 cache memory being full, second data or third data stored in the L3 cache memory to evict based on a priority, the priority being based on an operating frequency of a processing core for which the second data or the third data is requested, wherein the second data is associated with the second processing core and the third data is associated with the first processing core, the second data having a recency that is later than the third data and further comprising evicting the third data from the L3 cache memory.

10. The processor-implemented method of claim 9, further comprising adapting the recency of the second data and the third data by switching an assignment of least recently used from the third data to the second data.

11. The processor-implemented method of claim 10, further comprising:

fetching the first data from a main memory; and allocating a cache line in the L3 cache memory for the first data.

12. The processor-implemented method of claim 9, in which the first processing core and the second processing core each have a level two (L2) cache memory, the first processing core and the second processing core both generating second read requests to a same address in the L3 cache memory, the first processing core modifies a cache line for the address, and further comprising updating the L2 cache memory for the second processing core according to the modification.

* * * * *